Figure 1:
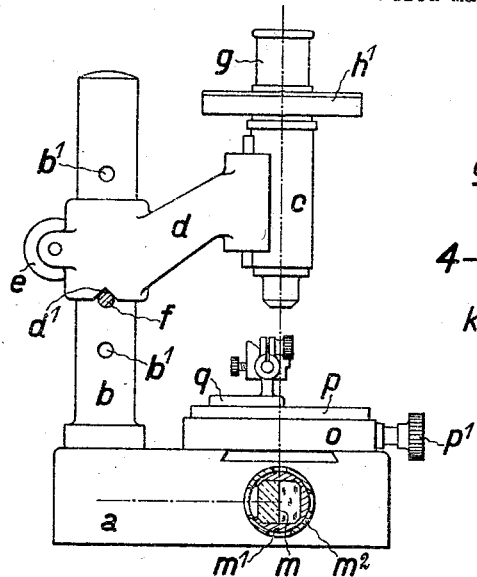

Aug. 11, 1925.

A. STEINLE 1,549,518

MEASURING MICROSCOPE

Filed May 26, 1922

Inventor:
Adolf Steinle

Patented Aug. 11, 1925.

1,549,518

UNITED STATES PATENT OFFICE.

ADOLF STEINLE, OF JENA, GERMANY, ASSIGNOR TO THE FIRM OF CARL ZIESS, OF JENA, GERMANY.

MEASURING MICROSCOPE.

Application filed May 26, 1922. Serial No. 563,958.

*To all whom it may concern:*

Be it known that I, ADOLF STEINLE, a citizen of the German Empire, and residing at Jena, Germany, have invented a new and usful Measuring Microscope, of which the following is a specification.

The present invention relates to measuring microscopes for examining and determining the dimensions of threads, i. e. such measuring microscopes in which the profile of the thread to be examined is compared with a standard profile, visible in the ocular field of the microscope. The object aimed at by the invention consists in so constructing such a microscope that, in spite of a simplified construction, it may be uniformly used for a larger number of different threads, that furthermore the thread to be examined is always well illuminated and that the screw to be examined and the microscope may be quickly and safely brought into the proper position relatively to each other.

In order to render possible an examination of different threads by means of the same microscope, the standard profile corresponding to each thread must be capable of being brought in a simple way into the ocular field. According to the invention this is effected by placing the profiles of all threads likely to occur as well as any other necessary micrometer or test-marks on a common ruled disc, disposed in the ocular-image plane and rotatable in its plane about an axis parallel to and laterally removed from the optic axis after the manner of a revolving diaphragm. The separate profiles of threads or micrometer marks are arranged on the ruled disc in such a manner that by rotation of the ruled disc all marks reach the field of view in succession. In order that at the same time any possible angular differences in the thread or flank can be measured, there is also disposed in the ocular-image plane a fixed angular graduation running concentrically with the axis of rotation of the ruled disc and admitting of reading off the amount of each rotation of the ruled disc by means of a reading mark which serves for each position of the ruled disc. The illumination of the thread to be examined is effected from below with the aid of two mirrors, viz, one which is disposed laterally of the microscope-axis and which reflects the illuminating rays, emanating about from the front, through an opening of the base-plate carrying the microscope towards the microscope-axis, and a reflector which is disposed inside the base plate in the microscope-axis and by which the incident rays are transmitted upwardly into the microscope. In order that the screw to be examined can be quickly brought into the proper position relatively to the microscope, special supporting devices are provided for on the base plate carrying the microscope, so that the screw automatically assumes the proper position for examination.

Figure 3:
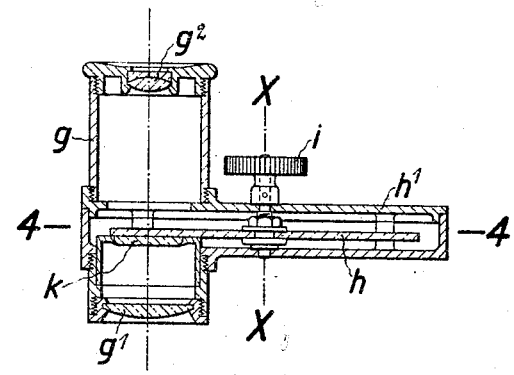
Figure 2:
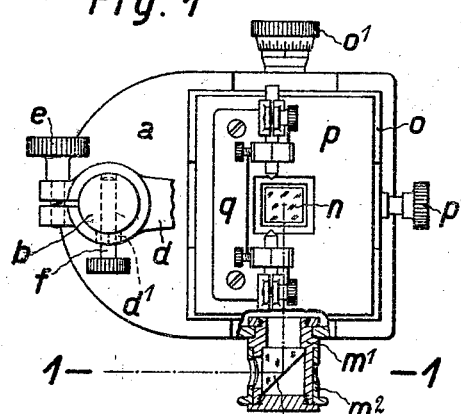
Figure 4:
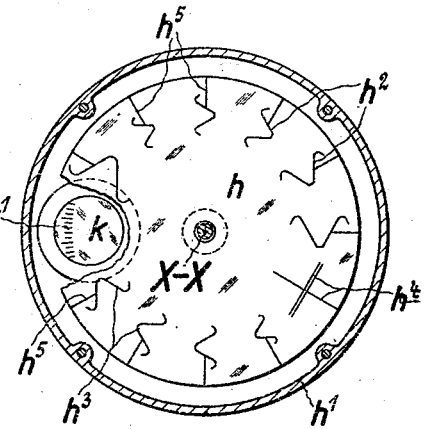
Figure 5:
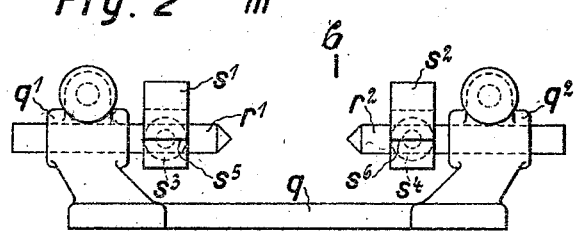
Figure 6:
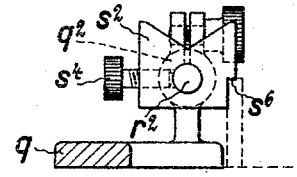

Particulars of the invention may be gathered from the constructional example shown in the annexed drawing and described hereafter. Fig. 1 is a section on the line and Fig. 2 a plan elevation of the whole measuring microscope, both figures partly in section. Figs. 3 and 4 show on an enlarged scale the ocular with the rotatable ruled disc, viz, Fig. 3 in a longitudinal section, Fig. 4 in a cross section on the line 4—4 of Fig. 3. Figs. 5 and 6 also show on an enlarged scale the supporting devices for holding or inserting the screw to be examined, viz, Fig. 5 in a front view and Fig. 6 in a cross section on the line 6—6 of Fig. 5.

On a base plate $a$ there is laterally fixed a pillar $b$ on which an arm $d$, carrying a microscope $c$, can be clamped by means of a set screw $e$ at different heights. The nave of the arm $d$ has at the bottom a ridge-shaped notch $d^1$, by means of which it fits into a pin $f$, inserted into one of the holes $b^1$ in the pillar $b$ and thereby centers the microscope. The ocular $g$ of the microscope, containing both a field-lens $g^1$ and an eye-lens $g^2$, is provided in the image-plane with a round ruled disc $h$, enclosed by a flat casing $h^1$, which disc is rotatable about a vertical axis X—X, lying laterally of the microscope-axis and being parallel to the same, and which disc is capable of being rotated from outside with the aid of a milled head $i$. On the ruled disc there are disposed in a circle a number of line-marks, viz, a number of profiles of metric threads $h^2$, a number of profiles of Whitworth threads $h^3$ as well as the crossed threads $h^4$ serving for general measuring work. In addition, each profile of thread is provided with a line-mark $h^5$, serving as a reading line and running in radial direction. Directly below the rotatable ruled disc $h$ there is in the ocular field a second rigidly disposed ruled disc $k$ which is provided with an angular graduation $k^1$, concentric with the axis of rotation X—X of the ruled disc $h$, so that it is possible to read off by means of the reading line $h^5$, existing in each profile of thread from the position for use the angular amount of a rotation of the ruled disc $h$. The illumination required for the measurement is effected by means of two reflecting prisms $m$ and $n$, the first of which $m$ being disposed laterally of the base plate $a$ and the second one $n$ fixed inside the base plate $a$ in the microscope-axis. The reflecting prism $m$ is supported within a cylindrical part $m^1$ which is rotatable about its horizontal axis and fastened to the base plate $a$, so that the prism $m$ is capable of receiving, according to its position, illuminating rays from different height directions and of transmitting them towards the second reflector. Besides, the cylindrical part $m^1$ is enclosed by a rotatable sleeve $m^2$, having at its cylindrical circumference four openings of different size, so that it is possible to regulate by rotating the sleeve $m^2$ the size of the aperture of the light-entrance and thereby to change the intensity of illumination. The stage of the microscope is formed by two slides $o$ and $p$, displaceable perpendicularly to each other, the lower one $o$ of which is adjustable by means of a screw $o^1$, the upper one $p$ by means of a screw $p^1$. Both slides $o$ and $p$ are provided at the centre with corresponding apertures for the passage of the illuminating rays upwardly transmitted by the reflector $n$. On the slide $p$ there is fixed a bed-plate $q$ (Figs. 5 and 6) which carries in two clamping bearings $q^1$ and $q^2$ connected therewith two pointed fixing pins $r^1$ and $r^2$, adjustable in their longitudinal direction. On each of the two fixing pins $r^1$ and $r^2$ rests on the side facing the other an adjustable, Y-shaped bearing body each $s^1$ and $s^2$ respectively, which are both capable of being fixed by a set screw each $s^3$ and $s^4$ respectively, so that cylindrical objects to be measured are at once brought into the proper measuring position by simply being laid upon the Y-bearing surfaces. In order that both Y-bearings can be conveniently adjusted parallelly to each other, the lateral boundary surfaces of both bearing bodies have the same position relatively to the V-surfaces, so that the latter are capable of being adjusted parallelly to each other by simultaneously applying corresponding surfaces of both bearing bodies to a ruler. In addition, the one side of both bearing bodies $s^1$ and $s^2$ is provided with one and the same angular excavation $s^5$ and $s^6$ respectfully, so that the V-surfaces can also be adjusted parallelly to each other by placing a ruler under the projection formed by these excavations (as shown by dotted lines in Fig. 6).

The operation of the above-described measuring microscope is substantially intelligible from its construction and is similar to that of the well-known microscopes of that kind. If, e. g. it be desirable to examine the thread of a cylindrical gauge, the examiner places the gauge by its generally cylindrical ends on the two Y-bearings, provides for a good illumination of the thread and displaces the two slides $o$ and $p$ of the microscope until the thread to be examined appears at the centre of the field of view. Now the ruled disc $h$ is rotated until the corresponding standard profile also appears in the field, so that it is possible to compare the two profiles of thread with each other or, in the event of the thread proving correct, to cause them to coincide. If, e. g. in the angle of thread there be an aberration, the amount of the inaccuracy can be determined in a simple way with the aid of the fixed angular graduation $k^1$ as follows. In the first place the one flank of the thread to be examined is caused to coincide with the corresponding flank of the standard thread by rotating the ruled disc $h$ and, if necessary, by displacing the slides $o$ and $p$, whereupon the reading takes place on the angular graduation $k^1$ by means of the reading line $h^5$. Hereupon, the other thread flank is caused in the same manner to coincide with the corresponding flank of the standard profile and the reading again takes place on the graduation $k^1$. The angle of rotation of the ruled disc $h$, resulting therefrom, indicates the error of the angle of thread.

Besides, attention may be drawn to the fact that by means of the crossed threads $h^4$ on the ruled disc $h$ it is possible to use the microscope in a known way both for any other measurements of threads and for general measuring work, hence, e. g. for the measurement of lengths or diameters, by using the crossed threads as an adjusting mark, so that the desired length is given by the corresponding displacement of the slide $o$ and $p$.

I claim:

1. In a microscope for measuring work pieces, a ruled disc, disposed in the ocular-image plane rotatably about an axis, which is laterally displaced from and parallel to the microscope axis, and a number of measuring-marks fixed on the said ruled disc in such a way that, on the disc being rotated, all measuring marks reach the ocular field in succession.

2. In a measuring microscope a ruled disc, disposed in the ocular-image plane rotatably about an axis, which is laterally displaced from and parallel to the microscope axis, a number of standard profiles of threads fixed on the said ruled disc in such a way that, on this disc being rotated all profiles of threads reach the ocular field in succession, each of them being provided with a reading line running in radial direction, and another ruled disc, rigidly disposed in the ocular field and provided with an angular graduation, concentric with the axis of the said rotatable ruled disc.

3. In a measuring microscope a ruled disc. disposed in the ocular-image plane rotatably about an axis, which is laterally displaced from and parallel to the microscope axis, a number of measuring-marks fixed on the said ruled disc in such a way that, on the disc being rotated, all measuring marks reach the ocular field in succession, a base plate carrying the microscope and two illuminating mirrors, one of these being disposed laterally of this base plate and the other within the said base plate in the microscope axis, about on a level with the first mirror, a hollow space being provided for in the base plate between the two mirrors.

4. In a measuring microscope a ruled disc, disposed in the ocular-image plane rotatably about an axis, which is laterally displaced from and parallel to the microscope axis, a number of measuring-marks fixed on the said ruled disc in such a way that, on the disc being rotated, all measuring marks reach the ocular field in succession, a base plate carrying the microscope and two illuminating mirrors, a mount disposed laterally of this base plate rotatably about a horizontal axis, one of these mirrors being fitted on this mount and the other within the said base plate in the microscope axis, about on a level with the first mirror, a hollow space being provided for in the base plate between the two mirrors.

5. In a measuring microscope a ruled disc, disposed in the ocular-image plane rotatably about an axis, which is laterally displaced from and parallel to the microscope axis, a number of measuring-marks fixed on the said ruled disc in such a way that, on the disc being rotated, all measuring marks reach the ocular field in succession, a base plate carrying the microscope and two illuminating mirrors, a mount disposed laterally of this base plate rotatably about a horizontal axis, a rotatable sleeve enclosing this mount and having along its circumference several apertures of different size, one of these mirrors being fitted on this mount and the other within the said base plate in the microscope axis, about on a level with the first mirror, a hollow space being provided for in the base plate between the two mirrors.

6. In a measuring microscope a base plate, a test-stage, two fixing pins displaceable relatively to each other and carrying an adjustable, Y-shaped bearing body each, a ruled disc, disposed in the ocular-image plane rotatably about an axis, which is laterally displaced from and parallel to the microscope axis, and a number of measuring-marks fixed on the said ruled disc in such a way that, on the disc being rotated, all measuring marks reach the ocular field in succession.

7. In a measuring microscope a base plate, a test-stage, two fixing pins displaceable relatively to each other and carrying an adjustable, Y-shaped bearing body, the latter being provided with adjusting surfaces having the same position relatively to the V-surfaces, a ruled disc, disposed in the ocular-image plane rotatably about an axis, which is laterally displaced from and parallel to the microscope axis, and a number of measuring-marks fixed on the said ruled disc in such a way that, on the disc being rotated, all measuring marks reach the ocular field in succession.

8. In a measuring microscope a base plate, a test-stage, two fixing pins displaceable relatively to each other and carrying an adjustable, Y-shaped bearing body, the latter being provided with lateral, angular excavations having the same position relatively to the V-surfaces, a ruled disc, disposed in the ocular-image plane rotatably about an axis, which is laterally displaced from and parallel to the microscope axis, and a number of measuring-marks fixed on the said ruled disc in such a way that, on the disc being rotated, all measuring marks reach the ocular field in succession.

ADOLF STEINLE.

Witnesses:
PAUL KRUGER,
FRITZ SANDER.